United States Patent
Kanamori

(10) Patent No.: US 10,684,932 B2
(45) Date of Patent: Jun. 16, 2020

(54) PROGRAM UPDATE SYSTEM, DISTRIBUTION DEVICE, AND PROGRAM UPDATE METHOD

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventor: Tsubasa Kanamori, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/325,283

(22) PCT Filed: Dec. 5, 2017

(86) PCT No.: PCT/JP2017/043642
§ 371 (c)(1),
(2) Date: Feb. 13, 2019

(87) PCT Pub. No.: WO2018/105609
PCT Pub. Date: Jun. 14, 2018

(65) Prior Publication Data
US 2019/0227785 A1 Jul. 25, 2019

(30) Foreign Application Priority Data
Dec. 6, 2016 (JP) .................................. 2016-236942

(51) Int. Cl.
*G06F 9/44* (2018.01)
*G06F 11/30* (2006.01)
(Continued)

(52) U.S. Cl.
CPC ............ *G06F 11/3055* (2013.01); *G06F 8/61* (2013.01); *G06F 8/65* (2013.01); *G06F 9/542* (2013.01);
(Continued)

(58) Field of Classification Search
CPC ... G06F 8/71; G06F 8/61; G06F 9/542; G06F 11/3055; G06F 8/65; G08B 5/222; G07C 5/008; H04L 67/34
See application file for complete search history.

(56) References Cited

U.S. PATENT DOCUMENTS

2007/0105542 A1\* 5/2007 Friedman ............ H04L 67/1068
455/420
2010/0262334 A1 10/2010 Yoshiyama
(Continued)

FOREIGN PATENT DOCUMENTS

JP 2002-358177 A 12/2002
JP 2006-180399 A 7/2006
(Continued)

OTHER PUBLICATIONS

Mar. 6, 2018 International Search Report issued in International Patent Application No. PCT/JP2017/043642.
(Continued)

*Primary Examiner* — Tuan A Vu
(74) *Attorney, Agent, or Firm* — Oliff PLC

(57) ABSTRACT

A program update system that includes a distribution device with an electronic control unit configured to distribute a
(Continued)

computer program; and a communication device with an electronic control unit configured to mutually transmit/receive a communication signal and a new computer program, thereby storing the new computer program distributed to the communication device into a memory of the communication device and updating the computer program.

9 Claims, 6 Drawing Sheets

(51) Int. Cl.
G07C 5/00 (2006.01)
G06F 9/54 (2006.01)
G06F 8/61 (2018.01)
G06F 8/65 (2018.01)
H04L 29/08 (2006.01)
B60R 16/023 (2006.01)

(52) U.S. Cl.
CPC ............ *G07C 5/008* (2013.01); *B60R 16/023* (2013.01); *H04L 67/34* (2013.01)

(56) References Cited

U.S. PATENT DOCUMENTS

| | | | |
|---|---|---|---|
| 2015/0007155 A1 | 1/2015 | Hoffman et al. | |
| 2015/0097669 A1* | 4/2015 | Li | G08B 5/222 340/539.13 |
| 2015/0193230 A1* | 7/2015 | Gaikwad | G06F 8/71 717/120 |
| 2016/0196126 A1* | 7/2016 | Csaszar | G06F 8/61 717/178 |
| 2017/0061708 A1* | 3/2017 | Sol | G07C 5/008 |

FOREIGN PATENT DOCUMENTS

| | | |
|---|---|---|
| JP | 2008-112213 A | 5/2008 |
| JP | 2013-109571 A | 6/2013 |
| JP | 2013-192092 A | 9/2013 |
| JP | 2015-129994 A | 7/2015 |

OTHER PUBLICATIONS

May 23, 2019 Extended Search Report issued in European Patent Application No. 17878297.5.
Mar. 27, 2020 Communication Pursuant to Article 94(3) EPC issued in European Patent Application No. 17 878 297.5.

* cited by examiner

PROGRAM UPDATE SYSTEM, DISTRIBUTION DEVICE, AND PROGRAM UPDATE METHOD

This application is the U.S. National Phase of PCT/JP2017/043642 filed Dec. 5, 2017, which claims priority from JP 2016-236942 filed Dec. 6, 2016, the entire disclosure of which is incorporated herein by reference.

BACKGROUND

The present disclosure relates to a program update system, a distribution device, and a program update method.

A control system using a plurality of control devices that perform control based on a computer program (hereinafter simply referred to as the "program") is used in various fields. In the field of vehicle control, many ECUs (Electronic Control Units) serving as the control devices are disposed inside a vehicle, and each ECU is configured to transmit/receive information via a vehicle-mounted LAN (Local Area Network), and to execute a variety of types of processing in cooperation and coordination with other ECUs.

The program executed by a processor of each of the above-described control devices may need to be updated, for example, when an addition or change is made to the function of the control device, or when a defect of the program is to be eliminated. As the method for updating the program, it is common to use a method in which an update program received by a specific control device from the outside via wired or wireless communication is transmitted to a control device to be updated, and the program is updated in the control device that has received the update program.

But, when a method is adopted in which the update program is overwritten with a pre-update old program in the device to be updated in the case of updating the program in such a control system, interruption of the update may disable an execution using the old program, making it also impossible to resume the update.

In this respect, JP 2013-192092A discloses a vehicle-mounted device in which a simple communication program is stored in advance in a memory block that is excluded from reprogramming (update of a program), and simple communication based on the simple communication program is performed during reprogramming, thus enabling reprogramming to be resumed by the simple communication even when reprogramming is interrupted and the old program is destroyed.

SUMMARY

A program update system according to an aspect of the present disclosure includes A program update system that includes a distribution device with an electronic control unit configured to distribute a computer program; and a communication device with an electronic control unit configured to mutually transmit/receive a communication signal and a new computer program, thereby storing the new computer program distributed to the communication device into a memory of the communication device and updating the computer program, wherein: a memory of the distribution device and the memory of the communication device are configured to store progress information representing a progress of transmission/reception of the communication signal and the new computer program, the electronic control unit of the distribution device is configured to: update the progress information stored in the memory of the distribution device, in accordance with the progress of transmission/reception; transmit the progress information updated to the communication device; if the progress information has been transmitted, receive the progress information stored in the memory of the communication device from the communication device; and specify a communication signal or a new computer program that is to be transmitted/received next between the communication device and the distribution device, in accordance with the progress information received, and the electronic control unit of the communication device is configured to: receive the progress information transmitted from the distribution device; update the progress information stored in the memory of the communication device, based on the progress information received; and transmit the progress information updated to the distribution device A program update system according to another aspect of the present disclosure includes a distribution device with an electronic control unit configured to distribute a computer program; and an update device with an electronic control unit configured to hold a computer program that is to be distributed and a new computer program, thereby distributing the new computer program acquired by the distribution device, storing the new computer program distributed to the update device into a memory of the update device, and updating the computer program, wherein: a memory of the distribution device and the memory of the update device each store progress information representing a progress of transmission/reception of a communication signal and the new computer program, the electronic control device of the distribution device is configured to: update the progress information stored in the memory of the distribution device, in accordance with the progress of transmission/reception; transmit the progress information updated to the update device; if the progress information has been transmitted, receive the progress information stored in the memory of the update device from the update device; and specify a communication signal or a new computer program that is to be transmitted/received next between the update device and the distribution device, in accordance with the progress information received; and the electronic control device of the update device is configured to: receive the progress information transmitted from the distribution device; update the progress information stored in the memory of the update device, based on the progress information received; and transmit the progress information updated to the distribution device.

A distribution device according to another aspect of the present disclosure is communicably connected to an external device configured to execute processing based on a computer program stored in a memory, and to mutually transmit/receive a communication signal and a new computer program between the external device and the distribution device, thereby distributing the new computer program to the external device and updating the computer program, the distribution device includes a memory for storing progress information representing a progress of transmission/reception of the communication signal and new computer program; and an electronic control unit that is configured to: update the progress information stored in the memory, in accordance with the progress of transmission/reception; transmit the progress information updated to the external device; receive, from the external device, the progress information updated by the external device based on the progress information transmitted; and specify a communication signal or a new computer program that is to be transmitted/received next between the external device and the distribution device, in accordance with the progress information received.

A program update method according to another aspect of the present disclosure is for a communication system with a distribution device configured to distribute a computer program; and a communication device configured to mutually transmit/receive a communication signal and a new computer program, thereby storing the new computer program distributed to the communication device into a memory of the communication device and updating the computer program, wherein a memory of the distribution device and the memory of the update device each store progress information representing a progress of transmission/reception of a communication signal and the new computer program, the method includes updating, with the distribution device, the progress information stored in the memory of the distribution device, in accordance with the progress of transmission/reception; transmitting, with the distribution device, the updated progress information to the communication device; receiving, with the distribution device, the progress information stored in the memory of the communication device from the communication device; specifying, with the distribution device, a communication signal or a new computer program that is to be transmitted/received next between the communication device and the distribution device, according to the received progress information; receiving, with the communication device, the progress information transmitted from the distribution device; updating, with the communication device, the progress information stored in the memory of the communication device, based on the received progress information; and transmitting, with the communication device, the updated progress information to the distribution device.

A program update method according to another aspect of the present disclosure is for a communication system with a distribution device configured to distribute a computer program; and an update device configured to hold a computer program that is to be distributed and a new computer program, thereby distributing the new computer program acquired by the distribution device, storing the new computer program distributed to the update device into a memory of the update device, and updating the computer program, wherein a memory of the distribution device and the memory of the update device each store progress information representing a progress of transmission/reception of a communication signal and the new computer program, the method includes: updating, with the distribution device, the progress information stored in the memory of the distribution device, in accordance with the progress of transmission/reception; transmitting, with the distribution device, the updated progress information to the update device; receiving, with the distribution device, the progress information stored in the memory of the update device from the update device; specifying, with the distribution device, a communication signal or a new computer program that is to be transmitted/received next between the update device and the distribution device, according to the received progress information; receiving, with the update device, the progress information transmitted from the distribution device; updating, with the update device, the progress information stored in the memory of the update device, based on the received progress information; and transmitting, with the update device, the updated progress information to the distribution device Note that the present application can be implemented not only as a program update system, a distribution device, and a program update method including such a characteristic processing unit, but also as a computer program for causing a computer to execute steps for executing such characteristic processing. In addition, part or all of the program update system or the distribution device may be implemented as a semiconductor integrated circuit, or as another system including the program update system or the distribution device.

DETAILED DESCRIPTION OF EMBODIMENTS

Figure 1:
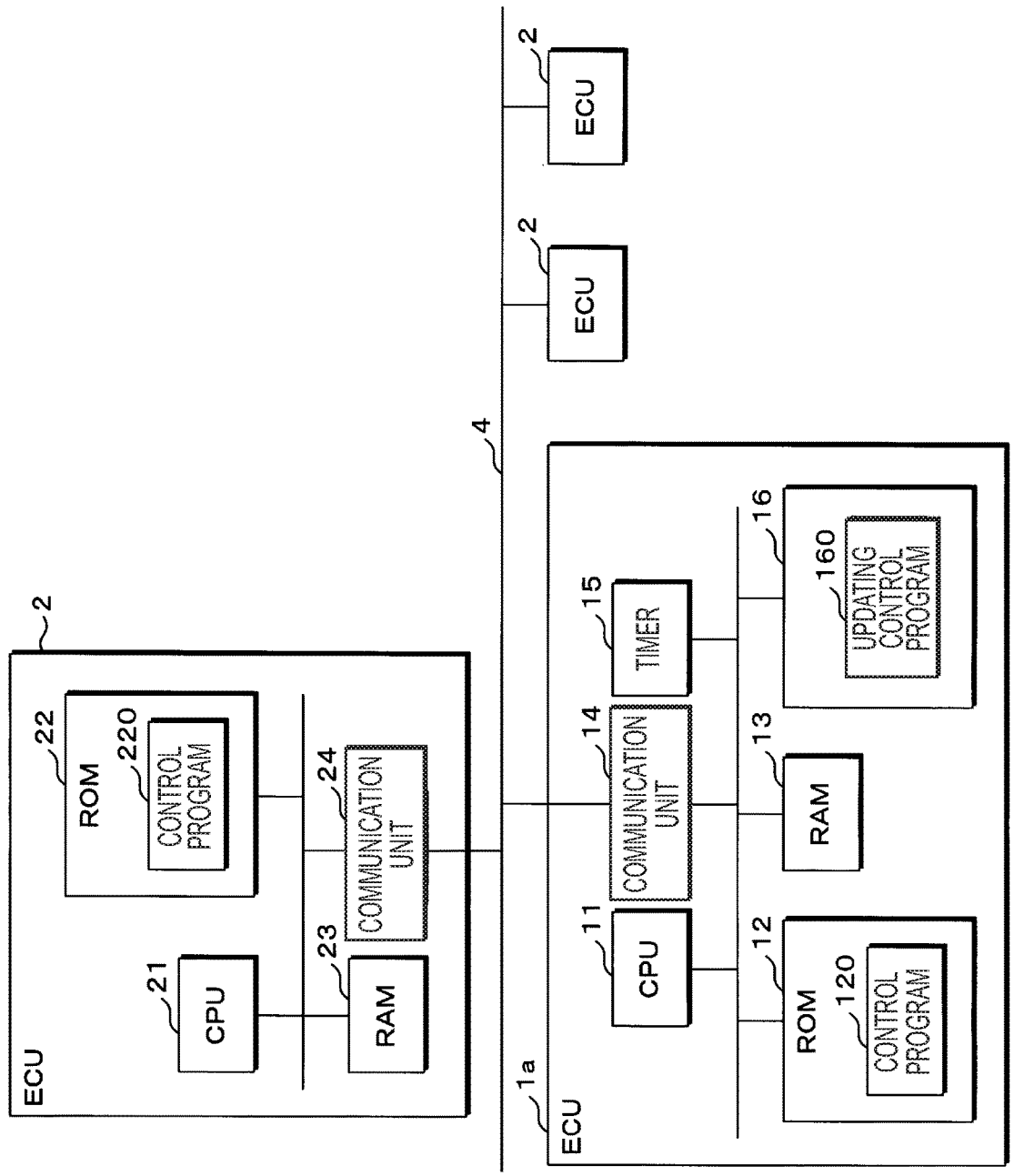
FIG. 1 is a block diagram showing an exemplary configuration of a program update system according to Embodiment 1 of the present disclosure.

Problems to be Disclosed by the Disclosure

However, the technique described in JP 2013-192092A does not take into consideration the resuming of the update at the point of interruption when the update of the program has been interrupted. Accordingly, the update of the program may not be normally completed when the update of the program is resumed from an interruption point that is recognized by the specific control device. In addition, there may be a lag in the progress of signal transmission/reception performed between the specific control device and the device to be updated.

The present disclosure has been made in view of such circumstances, and it is an object thereof to provide a program update system, a distribution device, and a program update method that can prevent the occurrence of a lag in the progress of signal transmission/reception performed between one control device and another control device.

Advantageous Effects of Disclosure

According to the foregoing, it is possible to prevent the occurrence of a lag in the progress of signal transmission/reception performed between one control device and another control device.

Description of Embodiments of the Disclosure

First, aspects of the present disclosure will be listed and described. At least some of the aspects described below may be combined freely.

(1) A program update system according to an aspect of the present disclosure is a program update system in which a plurality of devices each including a processor configured to execute processing based on a computer program stored in a memory are communicably connected, and a distribution device configured to distribute a computer program and a communication device mutually transmit/receive a communication signal and a new computer program, thereby storing the new computer program distributed to the communication device into the memory of the communication device and updating the computer program, wherein the distribution device and the communication device each include a storage unit for storing progress information representing a progress of transmission/reception the communication signal and the new computer program, the distribution device includes: a first update unit configured to update the progress information stored in the storage unit of the distribution device, in accordance with the progress of transmission/reception; a first transmission unit configured to transmit the progress information updated by the first update unit to the communication device; a first reception unit configured to, if the progress information has been transmitted by the first transmission unit, receive the progress information stored in the storage unit of the communication device from the communication device; and a specifying unit configured to specify a communication signal or a new computer program that is to be transmitted/received next between the communication device and the distribution device, in accordance with the progress information received by the first reception unit, and the communication device includes: a second reception unit configured to receive the progress information transmitted from the distribution device: a second update unit configured to update the progress information stored in the storage unit of the communication device, based on the progress information received by the second reception unit; and a second transmission unit configured to transmit the progress information updated by the second update unit to the distribution device.

(8) A program update method according to another aspect of the present disclosure is a program update method including: in a communication system in which a plurality of devices each including a processor configured to execute processing based on a computer program stored in a memory are communicably connected, mutually transmitting/receiving a communication signal and a new computer program between a distribution device configured to distribute a computer program and a communication device, thereby storing the new computer program distributed to the communication device into a memory of the of the communication device and updating the computer program, wherein the distribution device and the communication device each include a storage unit for storing progress information representing a progress of transmission/reception the communication signal and the new computer program, the distribution device updates the progress information stored in the storage unit of the distribution device, in accordance with the progress of transmission/reception; transmits the updated progress information to the communication device; receives the progress information stored in the storage unit of the communication device from the communication device; and specifies a communication signal or a new computer program that is to be transmitted/received next between the communication device and the distribution device, according to the received progress information; and the communication device receives the progress information transmitted from the distribution device; updates the progress information stored in the storage unit of the communication device, based on the received progress information; and transmits the updated progress information to the distribution device.

According to this aspect, while the distribution device and the communication device mutually transmit/receive the communication signal and the new computer program, the new computer program distributed to the communication device from the distribution device is stored in the memory of the communication device, thereby updating the computer program in the memory. The distribution device stores and updates the progress information representing the progress of transmission/reception of the communication signal and the new computer program into the storage unit thereof, in accordance with the progress of transmission/reception, and transmits the updated progress information to the communication device. The communication device updates the progress information stored in the storage unit thereof based on the progress information representing the progress received from the distribution device, and transmits the updated progress information to the distribution device. Then, the distribution device specifies the communication signal or the new computer program that is to be transmitted/ received next between the communication device and the distribution device, in accordance with the progress information received from the communication device. Consequently, the communication signal or the new computer program (hereinafter also collectively referred to simply as the "signals") that are to be transmitted/received next between the distribution device and the communication device are specified in accordance with the progress information updated by the communication device as the transmission/reception progresses. Accordingly, it is possible to prevent a lag in the progress of signal transmission/reception between the distribution device and the communication device.

(2) A program update system according to another aspect of the present disclosure is a program update system in which a plurality of devices each including a processor configured to execute processing based on a computer program stored in a memory are communicably connected, and a distribution device configured to distribute a computer program and an update device configured to hold a computer program that is to be distributed mutually transmit/receive communication signal and a new computer program, thereby distributing the new computer program acquired by the distribution device, storing the new computer program distributed to the communication device into the memory of the communication device, and updating the computer program, wherein, the distribution device and the update device each include a storage unit for storing progress information representing a progress of transmission/reception the communication signal and the new computer program, the distribution device includes: a first update unit configured to update the progress information stored in the storage unit of the distribution device, in accordance with the progress of transmission/reception; a first transmission unit configured to transmit the progress information updated by the first update unit to the update device; a first reception unit configured to, if the progress information has been transmitted by the first transmission unit, receive the progress information stored in the storage unit of the update device from the update device; and a specifying unit configured to specify a communication signal or a new computer program that is to be transmitted/received next between the update device and the distribution device, in accordance with the progress information received by the first reception unit, and the update device includes: a second reception unit configured to receive the progress information transmitted from the distribution device; a second update unit configured to update the progress information stored in the storage unit of the update device, based on the progress information received by the second reception unit; and a second transmission unit configured to transmit the progress information updated by the second update unit to the distribution device.

(9) A program update method according to another aspect of the present disclosure is a program update method including: in a communication system in which a plurality of devices each including a processor configured to execute processing based on a computer program stored in a memory are communicably connected, mutually transmitting/receiving a communication signal and a new computer program between a distribution device configured to distribute a computer program and an update device configured to hold a computer program that is to be distributed, thereby distributing the new computer program acquired by the distribution device to the communication device, storing the new computer program distributed to the communication device into a memory of the of the communication device, and updating the computer program, wherein the distribution device and the update device each include a storage unit for storing progress information representing a progress of transmission/reception the communication signal and the new computer program, the distribution device updates the progress information stored in the storage unit of the distribution device, in accordance with the progress of transmission/reception; transmits the updated progress information to the update device; receives the progress information stored in the storage unit of the update device from the update device; and specifies a communication signal or a new computer program that is to be transmitted/received next between the update device and the distribution device, according to the received progress information, and the update device receives the progress information transmitted from the distribution device; updates the progress information stored in the storage unit of the update device, based on the received progress information; and transmits the updated progress information to the distribution device.

According to this aspect, while the distribution device and the update device mutually transmit/receive the communication signal and the new computer program, the distribution device acquires the new computer program from the update device. The distribution device distributes the acquired new computer program to the communication device, and the communication device stores the distributed new computer program into the memory thereof, thus updating the computer program in the memory. The distribution device stores and updates the progress information representing the progress of transmission/reception of the communication signal and the new computer program into the storage unit thereof in accordance with the progress of transmission/reception, and transmits the updated progress information to the update device. The update device updates the progress information stored in the storage unit thereof based on the progress information received from the distribution device and representing the progress, and transmits the updated progress information to the distribution device. Then, the distribution device receives the progress information stored in the storage unit of the update device, and specifies the communication signal or the new computer program that is to be transmitted/received next between the update device and the distribution device. Consequently, the communication signal or the new computer program that is to be transmitted/received next between the distribution device and the update device is specified in accordance with the progress information updated by the update device as the signal transmission/reception progresses. Accordingly, it is possible to prevent a lag in the progress of signal transmission/reception between the distribution device and the update device.

(3) Preferably, the distribution device is configured to, if the transmission/reception of the communication signal and the new computer program has been interrupted, update the progress information stored in the storage unit of the distribution device by the first update unit, according to the communication signal or the new computer program for which transmission/reception is to be resumed.

If the transmission/reception of the communication signal or the new computer program performed between the distribution device and the communication device, or between the distribution device and the update device has been interrupted, the distribution device updates the progress information stored in the storage unit thereof according to the communication signal or the computer program that is to be transmitted/received at the time of resumption, and transmits the updated progress information to the communication device or the update device. Thereafter, the exchange of the progress information is performed in the above-described manner. Consequently, the communication signal or the new computer program that is to be transmitted/ received next between the distribution device and the communication device, or between the distribution device and the update device such that the progress information stored in the storage unit of the distribution device and the progress information stored in the storage unit of the communication device or the update device match to each other after resumption, and it is therefore possible to prevent a lag in the progress of signal transmission/reception between the distribution device and the communication device, or between the distribution device and the update device.

(4) Preferably, the distribution device includes: a third transmission unit configured to, if the transmission/reception of the communication signal and the new computer program has been interrupted, transmit a signal for requesting transmission of the progress information stored in the storage unit of the communication device or the update device to the communication device or the update device; a third reception unit configured to, if the signal has been transmitted by the third transmission unit, receive the progress information stored in the storage unit of the communication device or the update device from the communication device or the update device; a comparison unit configured to compare the progress information received by the third reception unit with the progress information stored in the storage unit of the distribution device; a second specifying unit configured to specify the progress information representing a slower progress, based on a result of the comparison performed by the comparison unit; a third update unit configured to store and update the progress information specified by the second specifying unit into the storage unit of the distribution device; and a fourth transmission unit configured to transmit the progress information updated by the third update unit to the communication device or the update device, and the communication device or the update device further includes: a fourth reception unit configured to receive a signal for requesting transmission of the progress information from the distribution device; a fifth transmission unit configured to, if the signal has been received by the fourth reception unit, transmit the progress information stored in the storage unit of the communication device or the update device to the distribution device; a fifth reception unit configured to, if the progress information has been transmitted by the fifth transmission unit, receive the progress information stored in the storage unit of the distribution device from the distribution device; and a fourth update unit configured to store and update the progress information received by the fifth reception unit into the storage unit of the communication device or the update device.

According to this aspect, if the transmission/reception of the communication signal or the new computer program between the distribution device and the communication device, or between the distribution device and the update device has been interrupted, the distribution device transmits, to the communication device or the update device, a signal for requesting the transmission of the progress information stored in the storage unit of the communication device or the update device, and the communication device or the update device that has received the signal transmits the progress information stored in the storage unit thereof to the distribution device. The distribution device that has received the progress information compares the received progress information with the progress information stored in the storage unit thereof, then specifies the progress information representing the slower progress, and stores and updates the specified progress information into the storage unit thereof, and transmits the updated progress information to the communication device or the update device. The communication device or the update device that has received the progress information stores and updates the received progress information into the storage unit thereof. Consequently, the communication signal or the new computer program that is to be transmitted/received next is specified in conformity with one of the distribution device and the communication device, or one of the distribution device and the update device whose progress of signal transmission/reception is slower. Accordingly, it is possible to prevent a lag in the progress of signal transmission/reception between the distribution device and the communication device, or between the distribution device and the update device.

(5) Preferably, the communication device or the update device further includes a determination unit configured to determine whether the progress represented by the progress information received by the second reception unit is faster than the progress represented by the progress information stored in the storage unit of the communication device or the update device by two or more times of transmission/reception of one of the communication signal and the new computer program, the second update unit is configured to, if it is determined by the determination unit that the progress represented by the progress information received by the second reception unit is not faster by two or more times of the transmission/reception, store and update the progress information received by the second reception unit into the storage unit of the communication device or the update device, and the second transmission unit is configured to transmit the progress information stored. In the storage unit of the communication device or the update device to the distribution device, regardless of a result of the determination performed by the determination unit.

According to this aspect, if it is not determined that the progress represented by the progress information received from the distribution device is faster than the progress represented by the progress represented by the progress information stored in the storage unit thereof by two or more times of the transmission/reception (transmission or reception) of either one of the communication signal and the new computer program, the communication device or the update device stores and updates the received progress information into the storage unit thereof, and transmits, to the distribution device, the progress information stored in the storage unit thereof, regardless of whether or not the progress information has been updated. Consequently, if the communication device or the update device determines, from the received progress information, that the progress of signal transmission/reception in the distribution device is faster than the scheduled progress, the communication device or the update device transmits, to the distribution device, the progress information stored in the storage unit thereof without updating the progress information. Accordingly, it is possible to prevent the signal transmission/reception from progressing in the distribution device. If the communication device or the update device determines, from the received progress information, that the progress of signal transmission/reception in the distribution device is not faster than the scheduled progress, the communication device or the update device transmits the received progress information to the distribution device. Accordingly, it is possible to match the progress information stored in the storage unit of the communication device or the update device to the progress of signal transmission/reception in the distribution device.

(6) Preferably, the new computer program is divided into a plurality of program segments, and the distribution device and the communication device, or the distribution device and and the update device are configured to mutually sequentially transmit/receive the divided program segments.

According to this aspect, the plurality of divided program segments of the new computer program are sequentially transmitted/received between the distribution device and the communication device, or between the distribution device and the update device. Accordingly, it is possible to prevent a a lag in the progress of transmission/reception for each one of the divided program segments of the computer program.

(7) A distribution device according to another aspect of the present disclosure is a distribution device that is communicably connected to an external device configured to execute processing based on a computer program stored in a memory; and mutually transmit/receive a communication signal and a new computer program between the external device and the distribution device, thereby distributing the new computer program to the external device and updating the computer program, the distribution device including: a storage unit for storing progress information representing a progress of transmission/reception of the communication signal and new computer program; an update unit configured to update the progress information stored in the storage unit, in accordance with the progress of transmission/reception; a transmission unit configured to transmit the progress information updated by the update unit to the external device; a reception unit configured to receive, from the external device, the progress information updated by the external device based on the progress information transmitted by the transmission unit; and a specifying unit configured to specify a communication signal or a new computer program that is to be transmitted/received next between the external device and the distribution device, in accordance with the progress information received by the reception unit.

According to this aspect, while the distribution device mutually transmits/receives the communication signal and the new computer program between the external device and the distribution device, a new computer program is distributed to the external device, thus updating the computer program in the memory. The distribution device stores and updates the progress information representing the progress of transmission/reception of the communication signal and the new computer program into the storage unit in accordance with the progress of transmission/reception, and transmits the updated progress information to the external device. The distribution device receives, from the external device, the progress information updated by the external device based on the progress information transmitted to the external device, and specifies the communication signal or the new computer program that is to be transmitted/received next between the external device and the distribution device, according to the received progress information. Consequently, the communication signal or the new computer program that is to be transmitted/received next between the external device and the distribution device is specified in accordance with the progress information updated by the external device as the signal transmission/reception progresses. Accordingly, it is possible to prevent a lag in the progress of signal transmission/reception between the distribution device and the external device.

Details of Embodiments of the Disclosure

Specific examples of program update systems according to embodiments of the present disclosure will be described below with reference to the drawings. The technical features described in the embodiments may be combined with each other.

Embodiment 1

FIG. 1 is a block diagram showing an exemplary configuration of a program update system according to Embodiment 1 of the present disclosure. The program update system includes one or more ECUs 2 (corresponding to communication devices and the external devices) that control a vehicle-mounted device (not shown), and an ECU 1a (corresponding to a distribution device) communicably connected to the ECUs 2 via a communication line 4. The ECU 1a may also be, for example, a relay device that receives a signal transmitted from an ECU 2 connected to one communication line, and transmits the signal to an ECU 2 connected to another communication line.

The ECU 1a includes a microcomputer including a CPU (Central Processing Unit) 11 (corresponding to a processor). The CPU 11 is bus-connected to a ROM (Read Only Memory) 12 (corresponding to a memory) that stores information such as a control program 120 (corresponding to a computer program), a RAM (Random Access Memory) 13 (corresponding to a storage unit) that stores temporarily generated information, and a timer 15 that measures an elapsed time or the like. The ROM 12 is constituted by a nonvolatile memory such as a flash memory, an EPROM (Erasable Programmable Read Only Memory), or an EEPROM (Electrically EPROM: registered trademark). The RAM 13 is constituted by a rewritable memory such as a DRAM (Dynamic Random Access Memory) or an SRAM (Static Random Access Memory).

A communication unit 14 that performs communication using a communication protocol such as CAN (Controller Area Network), LIN (Local Interconnect Network), MOST (Media Oriented Systems Transport), TCP/IP (Transmission Control Protocol/Internet Protocol), AVTP (Audio Video Transport Protocol), or FlexRay (registered trademark), and an internal storage device 16 are further bus-connected to the CPU 11. The internal storage device 16 may be, for example, a hard disk device or a flash memory, and an updating control program 160 (corresponding to a new computer program) that is to be transmitted to ECU 2 is transferred from an external device (not shown), and is stored therein.

The ECU 2 includes a microcomputer including a CPU 21 (corresponding to a processor). The CPU 21 is bus-connected to a ROM 22 (corresponding to a memory) that stores information such as a control program 220 (corresponding to a computer program), a RAM 23 (corresponding to a storage unit) that stores temporarily generated information, and a communication unit 24 that performs communication using the same communication protocol as that used by the communication unit 14. The ROM 22 may be, for example, a rewritable memory such as a flash memory.

In the above-described configuration, the ECU 1a and the ECU 2 each transmit/receive a communication signal and an updating control program 160 (hereinafter also collectively referred to simply as the "signals") to or from each other using the communication units 14 and 24, and, thereby, the ECU 1a distributes the updating control program 160 to the ECU 2. As used herein, "transmission/reception" refers to processing in which one communication signal or updating control program 160 is transmitted from one of the ECU 1a and the ECU 2, and is received by the other. The ECU 2 updates the control program. 220 by causing the updating control program 160 distributed from the ECU 1a to be stored in the ROM 22 in order to overwrite the control program 220 stored in the ROM 22.

Figure 2:
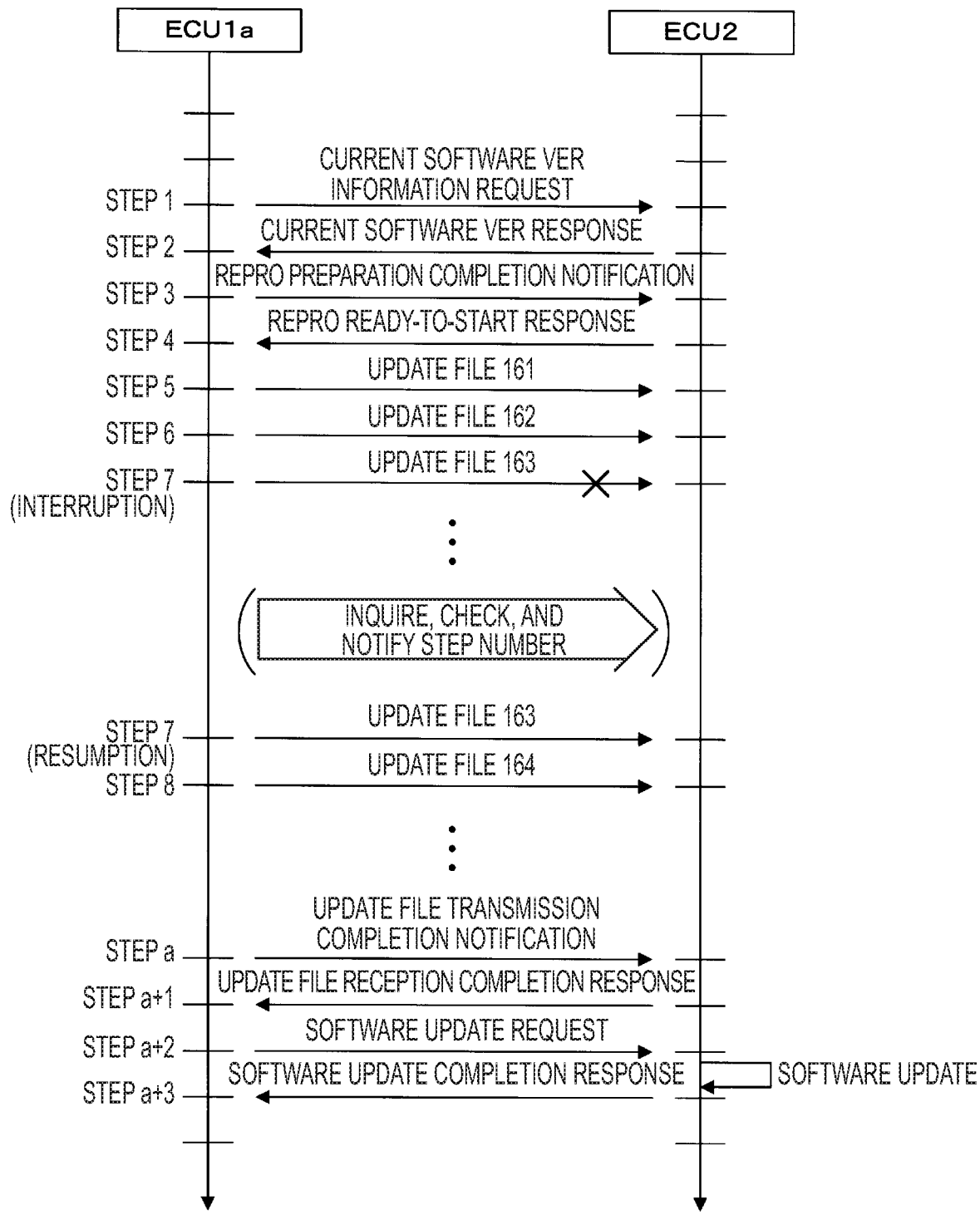
FIG. 2 is a sequence diagram illustrating a communication signal and an updating control program transmitted/received between ECUs.

FIG. 2 is a sequence diagram illustrating communication signals and an updating control program 160 transmitted/received between the ECU 1a and an ECU 2. In the following, the progress of the transmission/reception is represented by a step number (corresponding to progress information representing the progress in transmission/reception). In FIG. 2, the control program 220 is denoted as "software", and its version is denoted as "Ver". The processing relating to the update of the control program 220 is referred to as "reprogramming". Although the updating control program 160 is divided into update files 161, 162 . . . in Embodiment 1, the present disclosure is not limited thereto. Each one of the update files 161, 162 . . . is a signal transmitted/received between the ECU 1a and the ECU 2. The sequence shown in FIG. 2 is merely an example, and the present disclosure is not limited thereto.

At the time of executing reprogramming, the ECU 1a transmits the current software Ver information request (one of the communication signals) to an ECU 2 (step 1), and the ECU 2 that has received this request returns, to the ECU 1a, the current software Ver response (one of the communication signals) in which the information indicating the current version of the control program 220 is contained (step 2). Next, the ECU 1a confirms that the version of the control program 220 is a version to be subjected to reprogramming, and transmits a REPRO preparation completion notification (one of the communication signals) to the ECU 2 (step 3), and the ECU 2 that has received this notification returns a REPRO ready-to-start response (one of the communication signals) to the ECU 1a if the ECU 2 is ready to start reprogramming (step 4).

Next, the ECU 1a sequentially transmits update files 161, 162 . . . to the ECU 2 (steps 5, 6 . . . ). The ECU 2, on one side, sequentially receives the update files 161, 162 and temporarily stores the update files in a buffer area (not shown) in the RAM 23. After transmitting all of the plurality of divided program segments of the updating control program 160, the ECU 1a transmits an update file transmission completion notification (one of the communication signals) to the ECU 2 (step a), and the ECU 2 that has received this notification returns an update file reception completion response (one of the communication signals) to the ECU 1*a* when the updating control program 160 has been normally received (step a+1).

Afterward, the ECU 1*a* transmits a software update request (one of the communication signals) to the ECU 2 (step a+2), and the ECU 2 that has received this request performs the software update by overwriting the control program 220 with the updating control program 160 stored in the above-described buffer area, and subsequently returns a software update completion response (one of the communication signals) to the ECU 1*a* (step a+3).

The respective control programs 120 and 220 of the ECU 1*a* and the ECU each contain a task (processing routine) that transmits/receives the communication signals and the update files 161, 162 . . . using the above-described sequence. In Embodiment 1, the tasks that execute the transmission/reception sequence shown in FIG. 2 are referred to as "higher-level tasks", and the illustration of the flowchart thereof has been omitted. In the processing procedure executed by these higher-level tasks, the progresses of transmission/reception may not match between the ECU 1*a* side and the ECU 2 side, for example, when communication is temporarily interrupted between the ECU 1*a* and the ECU 2. Therefore, a lower-level task is provided under the above-described higher-level task on each of the ECU 1*a* side and the ECU 2 side, and the progresses of transmission/reception are matched by the lower-level tasks.

Specifically, in Embodiment 1, step numbers are stored in advance in the RAMs 13 and 23 in the ECU 1*a* and the ECU 2, respectively. Then, each time the communication signal and the update files 161, 162 . . . are transmitted/received between the higher-level tasks, various signals (hereinafter referred to as "lower-level signals") each containing a step number are transmitted/received between the lower-level tasks, thus matching the step numbers respectively stored in the RAMs 13 and 23.

For example, when transmission of the update file 163 has been interrupted (see the mark x in FIG. 2), the higher-level task transfers, to the lower-level tasks, the step number (step 7 in the example shown in FIG. 2) corresponding to the update file 163 to be transmitted/received when the transmission is resumed, and then resumes the transmission of the update file 163. Thereafter, by sending a notification of the step number matched between the RAMs 13 and 23 by the lower-level task from the lower-level task to the higher-level task, the continuity of transmission/reception of the update files 161, 162, 163 . . . can be maintained. The processing indicated by the white arrow in. FIG. 2 will be described in Embodiment 2, which will be discussed later. In the following, operations of the ECU 1*a* and the ECU 2 that transmit/receive the lower-level signals in the lower-level tasks located under the higher-level tasks will be described with reference to the flowchart illustrating the operations.

Figure 3:
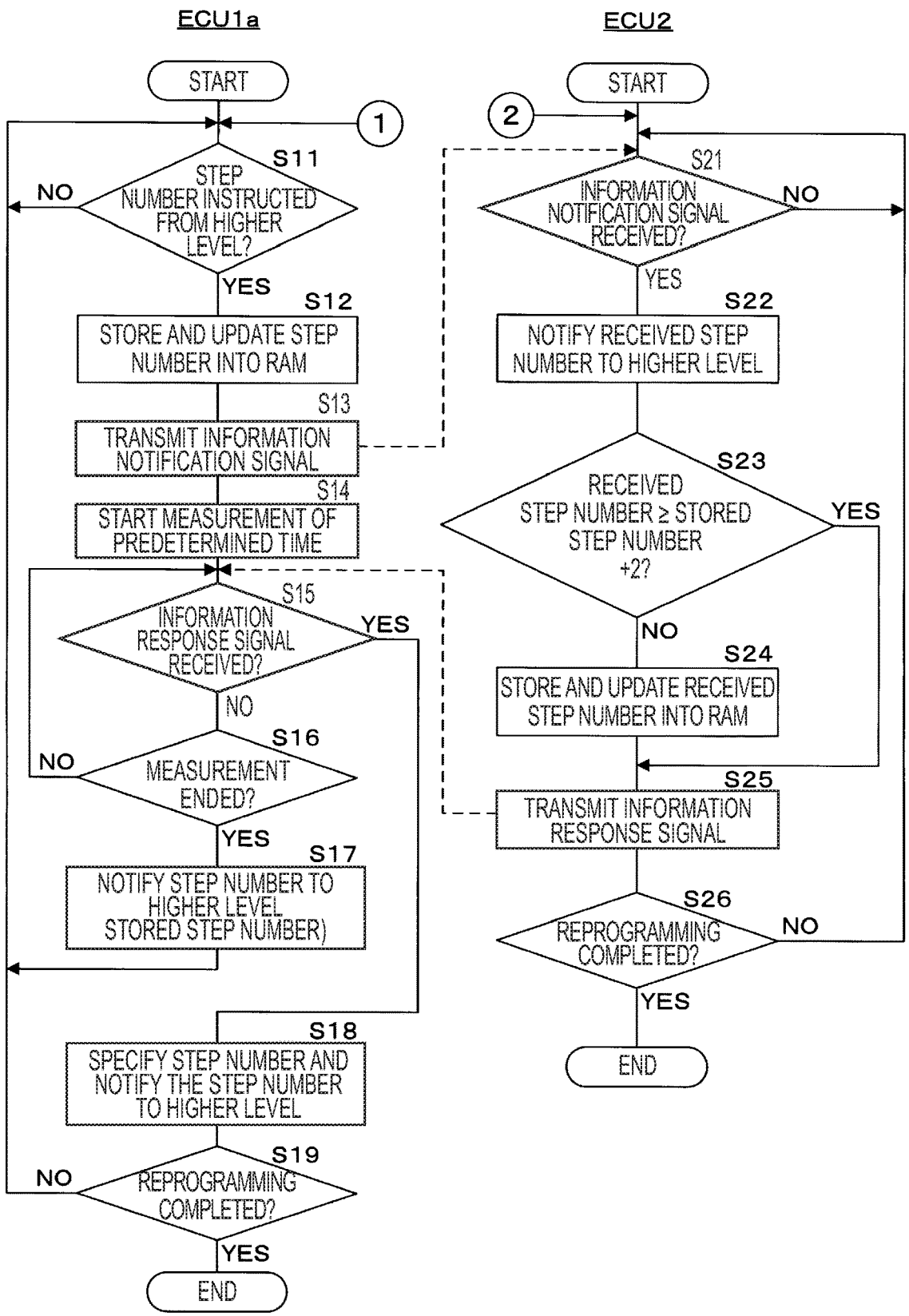
FIG. 3 is a flowchart illustrating a procedure of processing executed by a CPU that transmits and receives a lower-level signal containing a step number, each time a communication signal and an update file are transmitted/received.

FIG. 3 is a flowchart illustrating a procedure of processing executed by the CPU 11 and the CPU 21 transmitting and receiving a lower-level signal containing a step number, each time the communication signal and the update files 161, 162 . . . are transmitted/received. The processing of the lower-level task on the ECU 1*a* side shown in FIG. 3 is launched when reprogramming is started from step 1. The processing of the lower-level task on the ECU 2 side is launched timely when reprogramming can be started from step 1. When each of the processing on the ECU 1*a* side and the processing on the ECU 2 side shown in FIG. 3 is launched, the step numbers that are stored in the RAMs 13 and 23 are initialized to "step 0", which represents the step one step before step 1, for example. The CPU 11 is configured such that each time the higher-level task transmits and receives any one of the communication signal and the update files 161, 162 . . . , a step number is indicated (instructed) from the higher-level task. Whether reprogramming is completed is assumed to be managed by the higher-level task.

An outline of the processing shown in FIG. 3 is as follows. In order to follow the progress of transmission/reception of the communication signal and the update files 161, 162 . . . by the higher-level task, the CPU 11 of the ECU 1*a* stores and updates the step number of transmission/reception notified from the higher-level task into the RAM 13, and transmits a lower-level signal containing the updated step number to the ECU 2. The CPU 21 of the ECU 2 that has received the lower-level signal determines whether the step number contained in the received lower-level signal (hereinafter, the step number contained in each of the received lower-level signals is referred to as the "received step number") is greater than the step number stored in the RAM 23 by 2 or more. This determination is to determine whether the signal transmission/reception by the higher-level task on the ECU 1*a* side is progressing faster than that on the ECU 2 side.

If it is determined in the above-described determination that the step number is greater by 2 or more, the CPU 21 does not store the received step number into the RAM 23, and, therefore, the step number of transmission/reception that has been executed immediately previously as the scheduled progress is held in the RAM 23. On the other hand, if it is determined by the above-described determination that the step number is not greater by 2 or more, the CPU 21 stores and updates the received step number into the RAM 23, and, therefore, the step number of the transmission/reception that was executed last is stored in the RAM 23. Accordingly, the step number stored and updated in the RAM 23 will not be increased by more than 2 by a single update, but will be increased by 1 each time a single update is performed when the transmission/reception between higher-level tasks is progressing as scheduled. When the higher-level task performs the past transmission/reception again, the step number stored and updated in the RAM 23 may be changed, or may be decreased.

The CPU 21 further returns the lower-level signal containing the step number stored in the RAM 23 to the ECU 1*a*. The step number contained in the returned lower-level signal here is the step number for which matching between the ECU 1*a* and the ECU 2 has been confirmed. The CPU 11 of the ECU 1*a* that has received the returned lower-level signal specifies the step number obtained by adding 1 to the received step number, and notifies that step number to the higher-level task. Based on the notified step number, the higher-level task can determine the communication signal or the update file that is to be next transmitted/received to or from the ECU 2.

When each processing shown in FIG. 3 is actually launched, the CPU 11 on the ECU 1*a* side determines whether a step number has been instructed from the higher level (task) (S11). If a step number has not been instructed (S11: NO), the CPU 11 waits until a step number is instructed. If a step number has been instructed (S11: YES), the CPU 11 stores and updates the notified step number into the RAM 13 (S12: corresponding to a first update unit), and transmits, to the ECU 2, the information notification signal in which the updated step number is contained (S13: corresponding to a first transmission unit and a transmission unit).

In the ECU 2, on one side, the CPU 21 determines whether an information notification signal has been received (S21: corresponding to a second reception unit). If not (S21:

NO), the CPU 21 waits until an information notification signal is received. If an information notification signal has been received (S21: YES), the CPU 21 notifies the received step number to the higher level (task) (S22). Preferably, the higher-level task changes the signal to be transmitted next, or changes the waiting time of the signal to be received next, based on the notified step number.

Then, the CPU 21 determines whether the received step number is greater than the step number stored in the RAM 23 by 2 or more (S23: corresponding to a determination unit). If it is not greater than the stored step number by 2 or more (S23: NO), the CPU 21 stores and updates the received step number into the RAM 23 (S24: corresponding to a second update unit). If the processing of step S24 ends, or the received step number is greater than the stored step number by 2 or more (S23: YES), the CPU 21 transmits, to the ECU 1a, the information response signal in which the step number stored in the RAM 23 is contained (S25: corresponding to a second transmission unit).

Note that if the progress represented by the step number contained in the information notification signal received by the ECU 2 is faster than the progress represented by the step number stored in the RAM 23 by one time of transmission/reception of the signals (the communication signal and the updating control program 160), this corresponds to a case where the progress of transmission/reception of the last signal was as scheduled. If the progress is not faster by one or more times of transmission/reception, this corresponds to a case where the past signal transmission/reception was performed again.

Afterward, the CPU 21 determines whether reprogramming has been completed (S26). If reprogramming has been completed (S26; YES), the CPU 21 ends the processing in FIG. 3. In contrast, if reprogramming has not been completed (S26: NO), the CPU 21 shifts the processing to step S21, and returns to the waiting for reception of the information notification signal.

The CPU 11 of the ECU 1a, on the other side, starts measuring a predetermined time by the timer 15 when the processing of step S13 has ended (S14), and subsequently, determines whether an information response signal has been received (S15: corresponding to a first reception unit and the reception unit). Here, the predetermined time is preferably set to be shorter than the time during which the signal response is monitored by the higher-level task. If the information response signal has not been received (S15: NO), the CPU 11 determines whether the measurement of the predetermined time has ended (S16). If not (S16: NO), the CPU 11 shifts the processing to step S15.

If the measurement of the predetermined time has ended (S16: YES), the CPU 11 notifies the step number stored in the RAM 13 to the higher level (task) (S17), then shifts the processing to step S11, and returns to the waiting for an instruction from the higher level (task). Consequently, the higher-level task can determine that the signal that was sent and received last needs to be retransmitted. In step S17, a time-out may be notified without notifying the step number, and the subsequent change of the signal transmission/reception may be determined by the higher-level task.

If an information response signal has been received in step S15 (S15: YES), the CPU 11 specifies the step number that is larger than the received step number by 1 and notifies the step number to the higher level (task) (S18: corresponding to a specifying unit). Consequently, the communication signal or the update file that is to be transmitted/received next by the higher-level task is determined. Here, the step number that is notified to the higher-level task matches the step number relating to the signal that is scheduled to be transmitted/received next by the higher-level task, or a number smaller than that number. The higher-level task on the ECU 1a side checks, for example, the step number relating to the update file that is scheduled to be transmitted next against the step number notified by the lower-level task. If the checked results match, the higher-level task transmits the scheduled update file. If the checked results do not match, the higher-level task restores the step number relating to the update file to the notified step number. Consequently, the higher-level task can continue the transmission of a series of update files 161, 162 . . . in the form of retransmission of only some of the plurality of update files that have been already transmitted.

Afterward, the CPU 11 determines whether reprogramming has been completed (S19). If reprogramming has been completed (S19: YES), the CPU 11 ends the processing in FIG. 3. In contrast, if reprogramming has not been completed (S19: NO), the CPU 11 shifts the processing to step S11, and returns to the waiting for an instruction from the higher level (task).

Matching of the step numbers that are stored in the respective RAMs 13 and 23 on the ECU 1a side and the ECU 2 side by the processing based on the above-described flowchart will be described with reference to FIG. 2, separately for the following cases.

(a) A case where a communication signal (e.g., the current software Ver information request) transmitted from the ECU 1a has not been received by the ECU 2, and the lower-level signal (information notification signal) transmitted from the ECU 1a in response to the communication signal has been received by the ECU 2.

(b) A case where a communication signal (e.g., the current software Ver information request) transmitted from the ECU 1a has been received by the ECU 2, and the lower-level signal (information notification signal) transmitted from the ECU 1a in response to the communication signal has not been received by the ECU 2.

(c) A case where a communication signal (e.g., the current software Ver response) transmitted from the ECU 2 is no received by the ECU 1a.

(d) A case where the update file 161, 162 . . . (e.g., the update file 161) transmitted from the ECU 1a has not been received by the ECU 2, and the lower-level signal (information notification signal) transmitted from the ECU 1a according to the update file 161 has been received by the ECU 2.

(e) A case where the lower-level signal (information notification signal) transmitted from the ECU 1a according to the update file 161, 162 . . . (e.g., the update file 161) transmitted from the ECU 1a has not been received by the ECU 2.

(f) A case where the higher-level task on the ECU 1a side has interrupted the sequence shown in FIG. 2 for some reason.

Case (a): If the information notification signal has been transmitted from the ECU 1a in response to the current software Ver information request, the step number that is stored in each of the RAMs 13 and 23 is step 1. Afterward, step 2, which is the number obtained by adding 1 to the step number (here, step 1) contained in the information response signal received by the ECU 1a, is notified to the higher-level task. However, the higher-level task cannot receive the current software Ver response, and thus ignores this notification and retransmits the current software Ver information request. Since the step number contained in the information notification signal transmitted from the ECU 1*a* in response to this retransmission is step 1, there is no mismatch between the step numbers.

Case (b): Since the current software Ver response has been transmitted from the ECU 2 and received by the ECU 1*a* in a state in which the information notification signal transmitted from the ECU 1*a* in response to the current software information request has not been received by the ECU 2, the step numbers stored in the RAMs 13 and 23 when the next information notification signal has been transmitted from the ECU 1*a* are step 2 and step 1, respectively. Then, if step 2, which is the number obtained by adding 1 to the step number (here, step 1) contained in the information response signal received by the ECU 1*a*, has been notified to the higher-level task, the higher-level task retransmits the current software Ver information request in order to restore the step number to step 2 without increasing the step number to step 3. Since the step number contained in the information notification signal transmitted from the ECU 1*a* in response to this retransmission is step 1, the step number stored in the RAM 13 is step 1, and the mismatch between the step numbers is eliminated.

Case (c): if the information notification signal has been transmitted from the ECU 1*a* in response to the current software Ver information request, the step number stored in each of the RAMs 13 and 23 is step 1. The higher-level task of the ECU 1*a* cannot receive the current software Ver response, and thus retransmits the current software Ver information request. Since the step number contained in the information notification signal transmitted from the ECU 1*a* in response to this retransmission is also step 1, there is no mismatch between the step numbers.

Case (d): If the information notification signal has been transmitted from the ECU 1*a* according to the first update file 161, the step number stored in each of the RAMs 13 and 23 is step 5. Afterward, if the update file 162 transmitted from the ECU 1*a* has been received by the ECU 2, the higher-level task of the ECU 2 may detect discontinuity of the update files, and request the ECU 1*a* for retransmission. Afterward, the step number contained in the information notification signal transmitted from the ECU 1*a* according to the retransmitted update file 161 is also step 5, and, therefore, there is no mismatch between the step numbers.

Case (e): As a result of the information notification signal having been transmitted from the ECU 1*a* in response to the previous REPRO ready-to-start response, the step number stored in each of the RAMs 13 and 23 is step 4. Afterward, if the information notification signal is transmitted from the ECU 1*a* according to the update file 162 in a state in which the information notification signal transmitted from the ECU 1*a* according to the update file 161 has not been received by the ECU 2, the step numbers stored in the RAMs 13 and 23 are step 6 and step 4, respectively. Then, step 5, which is the number obtained by adding 1 to the step number (here, step 4) contained in the information response signal received by the ECU 1*a*, is notified to the higher-level task, and thus the higher-level task retransmits the update file 161. Since the step number contained in the information notification signal transmitted from the ECU 1*a* in response to this retransmission is step 5, each of the step numbers stored in the RAMs 13 and 23 is step 5, so that the mismatch is eliminated. Note that, in this case, the retransmission procedure between the higher-level tasks is not required even if the first update file 161 has not been received by the ECU 2.

Case (f) The higher-level task on the ECU 1*a* side resumes the processing on the ECU 1*a* side show in FIG. 3 from step S11, thus bringing about a state in which an instruction of the step number is waited, and instructs the step number at the time of resumption for this processing. In response to this, the processing on the ECU 1*a* side shown in FIG. 3 stores the step number instructed in step S11 into the RAM 13, and, thereby, the information notification signal containing the stored step number is transmitted to the ECU 2, and the entire processing shown in FIG. 3 is resumed. From the description of Cases (a) to (e) discussed above, it is evident that the processing then proceeds such that the step numbers stored in the RAMs 13 and 23 match.

As described above, according to Embodiment 1, while the ECU 1*a* and the ECU 2 mutually transmit/receive the communication signal and the updating control program 160, the updating control program 160 that has been distributed from the ECU 1*a* to the ECU 2 is stored in the ROM 22 of the ECU 2, thus updating the control program 220 in the ROM 22. The ECU 1*a* stores and updates the step number representing the progress of transmission/reception of the communication signal and the updating control program 160 into the RAM 13 in accordance with the progress of transmission/reception, and transmits, to the ECU 2, the information notification signal in which the updated step number is contained. Based on the step number contained in the information notification signal received from the ECU 1*a*, the ECU 2 updates the step number stored in the RAM 23, and transmits, to the ECU 1*a*, the information response signal in which the updated step number is contained. Then, the ECU 1*a* specifies the communication signal or the updating control program 160 that is to be transmitted/received to and from the ECU 2, according to the step number contained din the information response signal received from the ECU 2. Consequently, the communication signal or the updating control program 160 that is to be transmitted/received next between the ECU 1*a* and the ECU 2 is specified according to the step number updated by the ECU 2 as the signal transmission/reception progresses. Accordingly, it is possible to prevent a lag in the progress of signal transmission/reception between the ECU 1*a* and the ECU 2.

According to Embodiment 1, while the communication signal and the updating control program 160 are mutually transmitted/received between the ECU 1*a* and the ECU 2, the updating control program 160 is distributed to the ECU 2, and causes the ECU 2 to update the control program 220 in the ROM 22. The ECU 1*a* stores and updates the step number representing the progress of transmission/reception of the communication signal and the updating control program 160 into the RAM 13 in accordance with the progress of transmission/reception, and transmits, to the ECU 2, the information notification signal in which the updated step number is contained. The ECU 1*a* receives, from the ECU 2, the information response signal containing the step number updated by the ECU 2 according to the step number contained in the information notification signal and transmitted to the ECU 2, and specifies the communication signal or the updating control program 160 that is to be transmitted/received next to and from the ECU 2, according to the step number contained in the received information response signal. Consequently, the communication signal or the updating control program 160 that is to be next transmitted/received to and from the ECU 2 is specified according to the step number updated by the ECU 2 as the signal transmission/reception progresses. Accordingly, it is possible to prevent a lag in the progress of signal transmission/reception between the ECU 1*a* and the ECU 2.

Furthermore, according to Embodiment 1, if it is not determined that the progress represented by the step number contained in the information notification signal received from the ECU 1a is faster than the progress represented by the step number stored in the RAM 23 by two or more times of the transmission/reception (transmission or reception) of either one of the communication signal and the updating control program 160, the ECU 2 stores and updates the received step number into the RAM 23, and transmits, to the ECU 1a, the information response signal in which the step number stored in the RAM 23 is contained, regardless of whether or not the step number has been updated. Consequently, if the ECU 2 determines, from the received step number, that the progress of signal transmission/reception in the ECU 1a is faster than the scheduled progress, the ECU 2 transmits the step number stored in the RAM 23 to the ECU 1a without updating that step number. Accordingly, it is possible to prevent the signal transmission/reception from progressing in the ECU 1a. If the ECU 2 determines, from the received step number, that the progress of signal transmission/reception in the ECU 1a is not faster than the scheduled progress, the ECU 2 transmits the received step number to the ECU 1a. Accordingly, it is possible to match the step number stored in the RAM 23 of the ECU 2 to the progress of signal transmission/reception in the ECU 1a.

Furthermore, according to Embodiment 1, if the transmission/reception of the communication signal and the updating control program 160 performed between the ECU 1a and the ECU 2 has been interrupted, the ECU 1a updates the step number stored in RAM 13 and transmits the updated step number to the ECU 2, according to the communication signal or the updating control program 160 that is to be transmitted/received at the time of resumption. Thereafter, the exchange of the step number is performed in the above-described manner. Accordingly, the communication signal or the updating control program 160 that is to be next transmitted/received between the ECU 1a and the ECU 2 is specified such that the step number stored in the RAM 13 of the ECU 1a and the step number stored in the RAM 23 of the ECU 2 match to each other after resumption, and. It is therefore possible to prevent a lag in the progress of signal transmission/reception between the ECU 1a and the ECU 2.

Embodiment 2

In Embodiment 1, the ECU 1a matches the step numbers respectively stored in the ECU 1a and the ECU 2 based on the determination performed in the ECU 2, whereas, in Embodiment 2, the ECU 1a independently matches the step numbers. The configuration of the program update system in Embodiment 2 is the same as that in Embodiment 1, and, therefore, portions that are the same as the corresponding portions in Embodiment 1 are denoted by the same reference numerals, and the description thereof has been omitted.

In the example shown in Embodiment 1, in a case where a sequence that has been interrupted is resumed (see Case (f)), including a case where the information response signal has not been successfully received within a predetermined time (see step S17 in FIG. 3), it may not be possible to prevent a lag in the progress of signal transmission/reception between the ECU 1a and the ECU 2 unless the higher-level task precisely knows the step number of the signal that is to be transmitted/received at the time of resumption.

Therefore, in Embodiment 2, the ECU 1a actively queries the ECU 2 for the step number, checks the acquired step number against the step number stored in the RAM 13, and notifies the matched step number to the ECU 2, as indicted by the white arrow in FIG. 2 of Embodiment 1. In the following, operations of the ECU 1a and the ECU 2 for transmitting/receiving the lower-level signal by the lower-level task located under the higher-level task that performs transmission/reception sequence shown in FIG. 2 will be described with reference to the flowcharts illustrating the operations.

Figure 4:
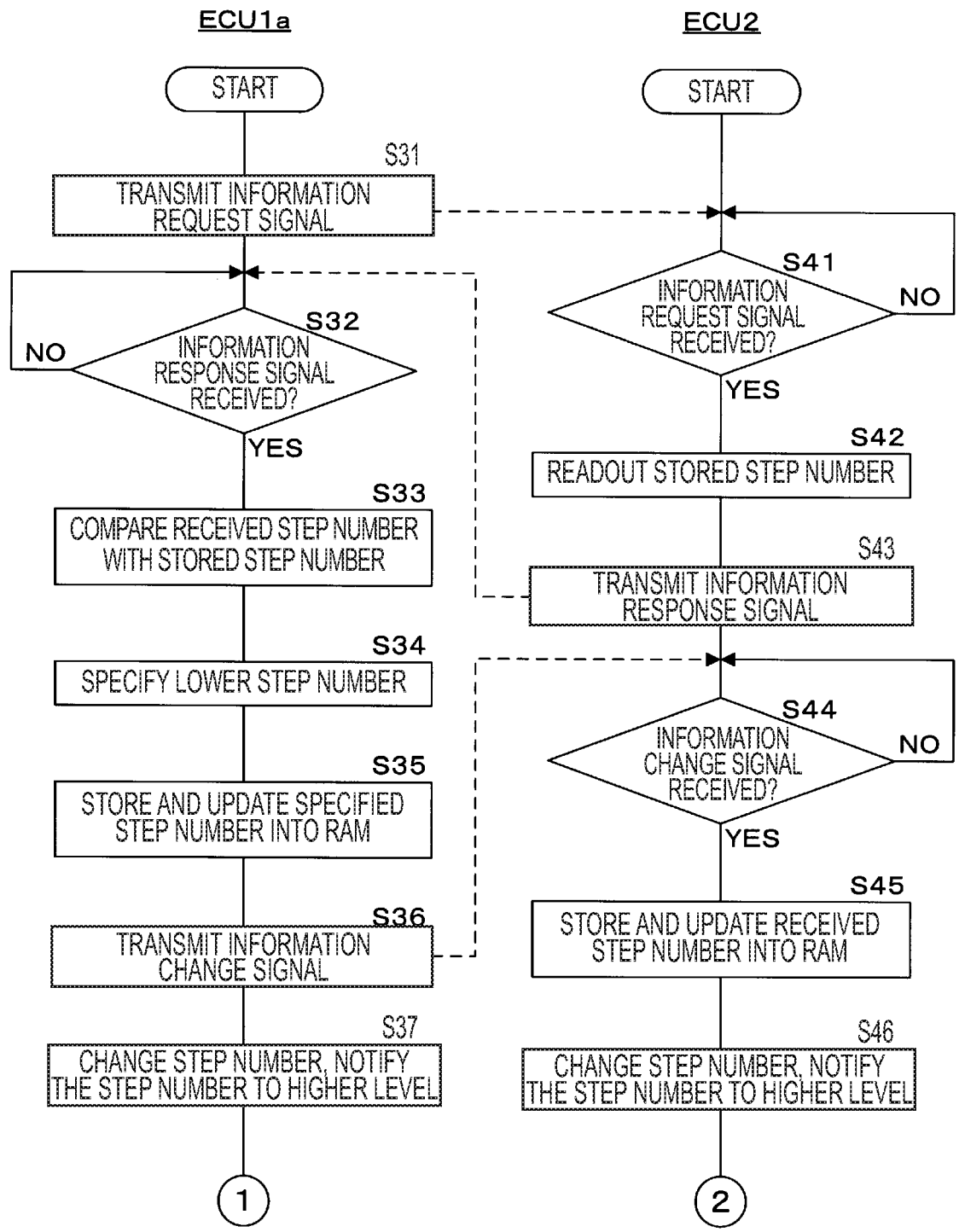
FIG. 4 is a flowchart illustrating a procedure of processing executed by a CPU that transmits and receives a lower-level signal for performing request, response, and notification of a step number.

FIG. 4 is a flowchart illustrating the processing procedure performed by the CPU 11 and the CPU 21 that transmit/receive a lower-level signal for performing request, response, and notification of a step number. The processing of the lower-level task on the ECU 1a side and that on the ECU 2 side shown in FIG. 4 are launched when reprogramming that has been interrupted once is resumed. On the ECU 2 side, the processing may be launched, for example, when the reception of the information notification signal (see step S21 in FIG. 3) has not been completed within a certain time.

An outline of the processing shown in FIG. 4 is as follows. The CPU 11 of the ECU 1a transmits, to the ECU 2, a lower-level signal for requesting a response for a step number. The ECU 2 that has received the lower-level signal transmits the lower-level signal containing the step number stored in the RAM 23 to the ECU 1a. The ECU 1a that has received the lower-level signal compares the received step number with the step number stored in the RAN 13, specifies the smaller step number, stores and updates the specified step number into the RAM 13, and transmits the lower-level signal containing the updated step number to the ECU 2. The ECU 2 that has received the lower-level signal stores and updates the received step number into the RAM 23. Consequently; the step numbers stored in the RAMs 13 and 23 are matched.

When the processing shown in FIG. 4 is actually launched, the CPU 11 on the ECU 1a side transmits the information request signal (S31: corresponding to a third transmission unit).

In the ECU 2, on one side, the CPU 21 determines whether an information request signal has been received (S41: corresponding to a fourth reception unit). If not, the CPU 21 waits until the information request signal is received (S41: NO). If the information request signal has been received (S41: YES), the CPU 21 reads out the step number stored in the RAM 23 (S42), and transmits, to the ECU 1a, the information response signal in which the readout step number is contained (S43: corresponding to a fifth transmission unit).

In the ECU 1a, on the other side, the CPU 11 determines whether an information response signal has been received (S32: corresponding to a third reception unit). If not, the CPU 11 waits until the information response signal is received (S32: NO). If the information response signal has been received (S32: YES), the CPU 11 compares the received step number with the step number stored in the RAM 13 (S33: corresponding to a comparison unit), and specifies the smaller step number based on a result of the comparison (S34: corresponding to a second specifying unit).

Then, the CPU 11 stores and updates the specified step number into the RAM 13 (S35: corresponding to a third update unit), and transmits, to the ECU 2, the information change signal in which the updated step number is contained (S36: corresponding to a fourth transmission unit). The CPU 11 sends, to the higher level, a notification indicating that the step number should be changed to the updated step number (S37), and subsequently shifts the processing to step S11 (see FIG. 3). Thereafter, the CPU 11 executes the processing on the ECU 1a side shown in FIG. 3. The higher-level task to which the notification indicating changing of the step number has been sent from the lower-level task changes, for example, the step number relating to the update file to the notified step number. Consequently, the higher-level task can resume the processing from the middle of transmission of a series of update files 161, 162 . . . .

In the ECU 2, on one side, the CPU 21 determines whether an information change signal has been received (S44: corresponding to a fifth reception unit). If not (S44: NO), the CPU 21 waits until the information change signal is received. If the information change signal has been received (S44: YES), the CPU 21 stores and updates the received step number into the RAM 23 (S45: corresponding to a fourth update unit), sends, to the higher level, a notification indicating that the step number should be changed to the updated step number (S46), and subsequently shifts the processing to step S21 (see FIG. 3). Thereafter, the CPU 21 executes the processing on the ECU 2 side shown in FIG. 3.

As described above, according to Embodiment 2, if the transmission/reception of the computer program between the ECU 1a and the ECU 2 has been interrupted, the ECU 1a transmits, to the ECU 2, an information request signal for requesting the transmission of the step number stored in the RAM 23 of the ECU 2, and the ECU 2 that has received this signal transmits, to the ECU 1a, the information response signal in which the step number stored in the RAM 23 is contained. The ECU 1a that has received the information response signal compares the step number contained in the information response signal with the step number stored in the RAM 23, specifies the smaller step number, and stores and updates the specified step number into the RAM 13, and transmits, to the ECU 2, the information change signal in which the updated step number is contained. The ECU 2 that has received the information change signal stores and updates the step number contained in the information change signal into the RAM 23. Consequently, the communication signal or the updating control program 160 that is to be transmitted/received next is specified in conformity with one of the ECU 1a and the ECU 2 whose progress of signal transmission/reception is slower. Accordingly, it is possible to prevent a lag in the progress of signal transmission/reception between the ECU 1a and the ECU 2.

Embodiment 3

In Embodiment 1, the ECU 1a transmits, to the ECU 2, the updating control program 160 stored in the internal storage device 16, and the ECU 2 that has received this program updates the control program 220 stored in the ROM 22. In contrast, in Embodiment 3, the update device 3 transmits, to an ECU 1b, an updating control program stored (held) in an internal storage device, then the ECU 1b further transmits the received updating control program to the ECU 2, and the ECU 2 that has received the updating control program updates the control program 220 stored in the ROM 22.

Figure 5:
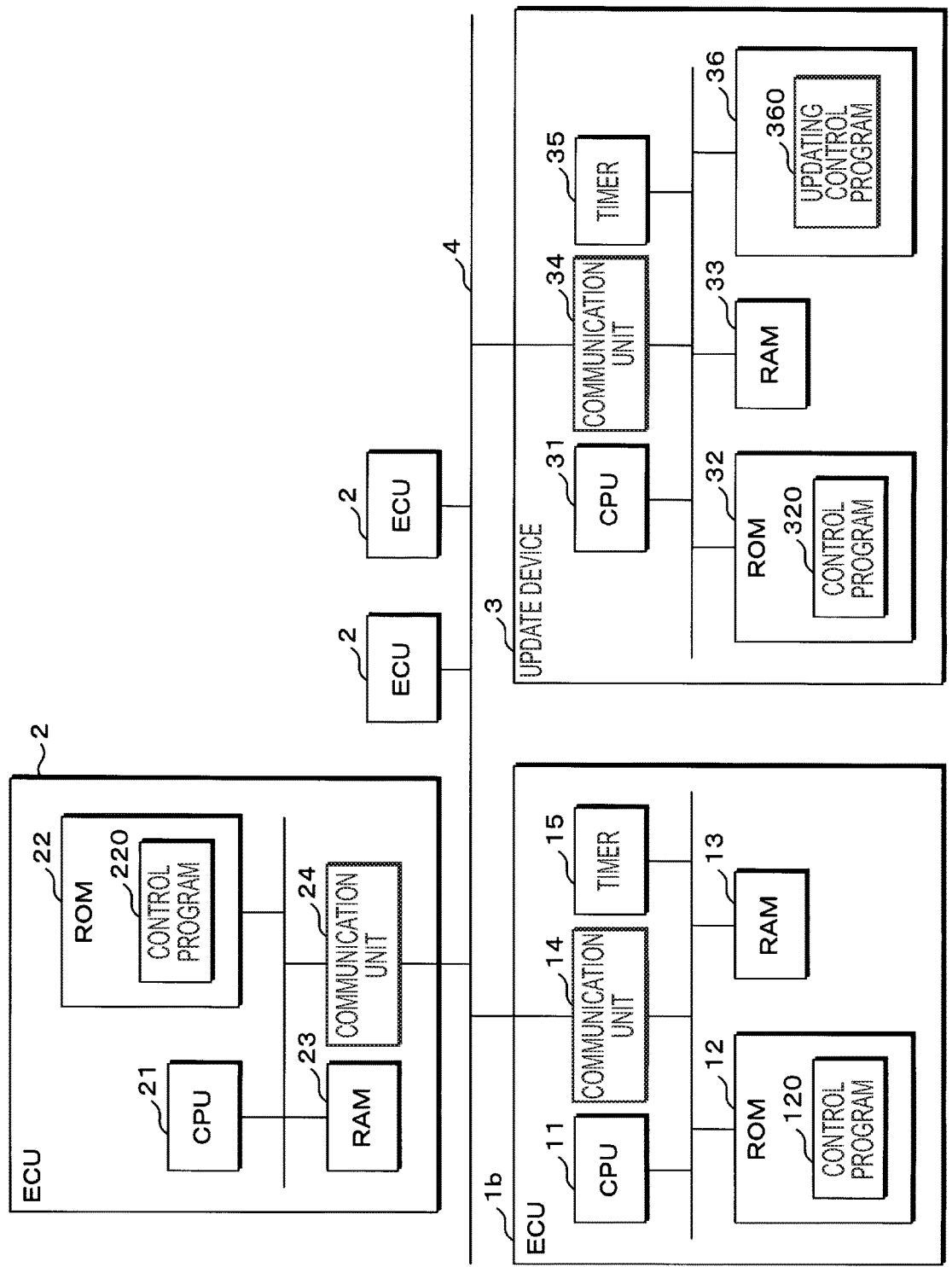
FIG. 5 is a block diagram showing an exemplary configuration of a program update system according to Embodiment 3 of the present disclosure.

FIG. 5 is a block diagram showing an exemplary configuration of a program update system according to Embodiment 3 of the present disclosure. The program update system includes one or more ECUs 2 (corresponding to a communication device), an ECU 1b (corresponding to a distribution device), and an update device 3, which are communicably connected via a communication line 4. The update device 3 may be connected with a connection cable, for example, via an OBD (On-Board Diagnostics) connector (not shown) of the ECU 1b.

Although the ECU 1b lacks the internal storage device 16 as compared with the ECU 1a of Embodiment 1 shown in FIG. 1, the rest of the configuration is the same as that of the ECU 1a.

The update device 3 includes a microcomputer including a CPU 31 (corresponding to a processor). The CPU 31 is bus-connected to a ROM 32 (corresponding to a memory) that stores information such as a control program 320 (corresponding to a computer program), a RAM 33 (corresponding to a storage unit) that stores temporarily generated information, a communication unit 34 that performs communication using the same communication protocol as that used by the communication units 14 and 24, a timer 35 that measures an elapsed time or the like, and an internal storage device 36.

The internal storage device 36 may be, for example, a hard disk device or a flash memory, and an updating control program 360 (corresponding to a new computer program) that is to be transmitted to the ECU 1b is stored therein in advance. The other portions that are the same as the corresponding portions in Embodiment 1 are denoted by the same reference numerals, and the description thereof has been omitted.

Using the above-described configuration, the ECU 1b and the update device 3 transmit/receive the communication signal and the updating control program 360 (hereinafter also collectively referred to simply as the "signals") to or from each other using the communication units 14 and 34, respectively. Thus, the ECU 1b acquires the updating control program 360 from the update device 3. The ECU 1b distributes the acquired updating control program 360 to the ECU 2 by following the procedure described in Embodiment 1, and the ECU 2 stores the distributed updating control program 360 into the RUM 22 in order to overwrite the control program 220 stored in the ROM 22, thus updating the control program 220.

Figure 6:
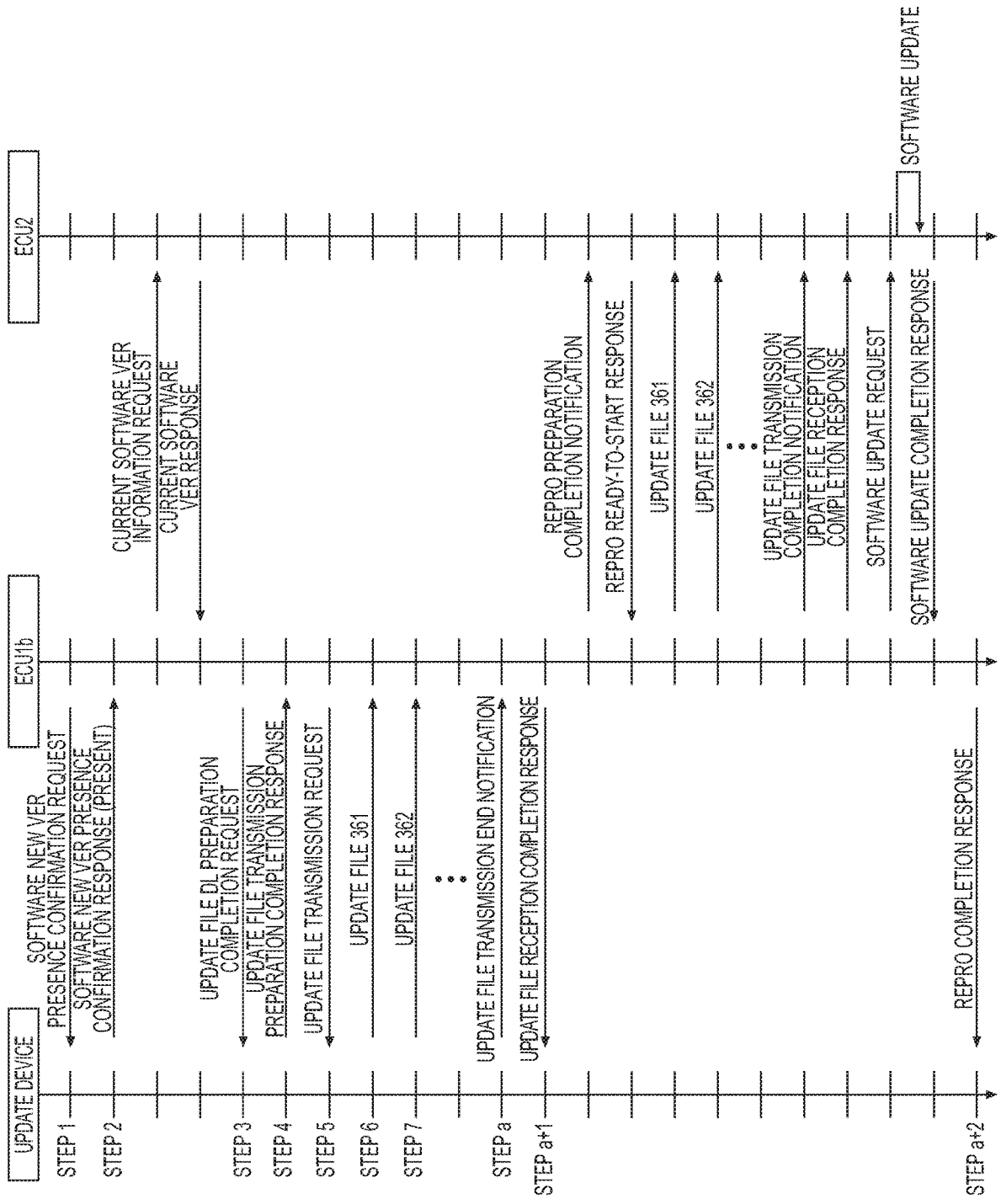
FIG. 6 is a sequence diagram illustrating a communication signal and an updating control program transmitted/received between an update device and an ECU.

FIG. 6 is a sequence diagram illustrating the communication signal and the updating control program 360 transmitted/received between the update device 3, the ECU 1b, and the ECU 2. In Embodiment 3, the updating control program 360 is divided into update files 361, 362 . . . . However, the present disclosure is not limited thereto. Each one of the update files 361, 362 . . . is a signal transmitted/received between the update device 3 and the ECU 1b, and between the ECU 1b and the ECU 2. The sequence shown in FIG. 6 is merely an example, and the present disclosure is not limited thereto. In the following, the communication sequence between the update device 3 and the ECU 1b will be mainly described. For example, the sequence used in the cases where the transmission/reception of the updating control program 360 is interrupted and resumed is the same as that shown in FIG. 2 of Embodiment 1, including a case where the query, checking, and notification of the step number are performed. Therefore, the illustration thereof has been omitted in FIG. 6. The communication sequence between the ECU 1b and the ECU 2 has already been described in Embodiment 1, and, therefore, the description thereof has been omitted here.

When performing reprogramming, the ECU 1b transmits a software new Ver presence confirmation request (one of the communication signals) to the update device 3 (step 1). If the updating control program 360 is stored in the internal storage device 36, the ECU 2 that has received this request returns a software new Ver presence confirmation response (present) (one of the communication signals) to the ECU 1b (step 2). Next, the ECU 1b confirms that the version of the control program 220 of the ECU 2 is a version to be subjected to reprogramming, and transmits an update file DL preparation request (one of the communication signals) to the update device 3 (step 3), and the update device 3 that has received this request returns an update file transmission preparation completion response (one of the communication signals) to the ECU 1b (step 4).

Next, the ECU 1b transmits an update file transmission request (one of the communication signals) to the update device 3 (step 5), and the update device 3 that has received this request sequentially transmits the update files 361, 362 to the ECU 1b (steps S6, 7 . . . ). After transmitting all of the plurality of divided program segments of the updating control program 360, the update device 3 transmits an update file transmission end notification (one of the communication signals) to the ECU 1b (step a). If the updating control program 360 has been normally received, the ECU 1b that has received the notification returns an update file reception completion response (one of the communication signals) to the update device 3 (step a+1). Afterward, if the processing procedure between the ECU 1b and the ECU 2 ends, the ECU 1b transmits a REPRO completion response (one of the communication signals) to the update device 3 (step a+2), and ends reprogramming.

The respective control programs 120 and 320 of the ECU 1b and the update device 3 each contain a higher-level task that transmits/receives the communication signals and the update files 361, 362 using the above-described sequence. Here, the illustration of the flowchart of the higher-level tasks that execute the transmission/reception sequence shown in FIG. 6 has been omitted. In the processing procedure executed by these higher-level tasks, the progresses of transmission/reception may not match between the ECU 1b and the update device 3, for example, when communication is temporarily interrupted between the ECU 1b side and the update device 3 side. Therefore, a lower-level task is provided under the above-described higher-level task on each of the ECU 1b side and the update device 3 side, and the progresses of transmission/reception are matched by the lower-level tasks.

Specifically, in Embodiment 3, step numbers are stored in the RAMS 13 and 33 in the ECU 1b and the update device 3, respectively. Then, each time the communication signal and the update files 361, 362 are transmitted/received between the higher-level tasks, the lower-level signals containing the step numbers are transmitted/received between the lower-level tasks, thus matching the step numbers respectively stored in the RAM 13 and 33.

Note that the flowchart illustrating operations of the lower-level tasks that transmit/receive the lower-level signals in the ECU 1b and the update device 3 is the same as a flow chart corresponding to the flowchart in FIG. 3 of Embodiment 1 in which the ECU 1a and the ECU 2 have been replaced by the ECU 1b and the update device 3, respectively, and, therefore, the illustration and the description thereof have been omitted.

Matching of the step numbers that are stored in the respective RAMs 13 and 33 on the ECU 1b side and the update device 3 side by the processing based on the above-described flowchart will be described with reference to FIG. 6, separately for the following cases.

(a) A case where the communication signal (e.g., the software new Ver presence confirmation request) transmitted from the ECU 1b has not been received by the update device 3, and the lower-level signal (information notification signal) transmitted from the ECU 1b in response to this communication signal has been received by the update device 3

(b) A case where a communication signal (e.g., the software new Ver presence confirmation request) transmitted from the ECU 1b has been received by the update device 3, and the lower-level signal (information notification signal) transmitted from the ECU 1b in response to the communication signal has not been received by the update device 3.

(c) A case where a communication signal (e.g., the software new Ver presence response) transmitted from the update device 3 has not been received by the ECU 1b.

(d) A case where the update file 361, 362 . . . (e.g., the update file 361) transmitted from the update device 3 has not been received by the ECU 1b, and the lower-level signal (information notification signal) transmitted from the ECU 1b according to the update file 361 has been received by the update device 3

(e) A case where the lower-level signal (information notification signal) transmitted from the ECU 1b according to the update file 361, 362 . . . (e.g., the update file 361) transmitted from the update device 3 has not been received by the update device 3.

(f) A case where the higher-level task on the ECU 1b side has interrupted the sequence shown in FIG. 6

Since it is evident that there is no mismatch for each of Cases (a), (b) and (c) as with Cases (a), (b), and (c) in Embodiment 1, the detailed description of these cases has been omitted.

Case (d): If the information notification signal has been transmitted from the ECU 1b according to the first update file 361, the step number stored in each of the RAMs 13 and 33 is step 6. Afterward, if the update file 362 transmitted from the update device 3 has been received by the ECU 1b, the higher-level task of the ECU 1b may discontinuity of the update file, and request the update device 3 for retransmission. Afterward, the step number contained in the information notification signal transmitted from the ECU 1b according to the retransmitted update file 361 is also step 6, and, therefore, there is no mismatch between the step numbers.

Case (e): As a result of the information notification signal having been transmitted from the ECU 1b in response to the previous update file transmission request, the step number stored in each of the RAMs 13 and 33 is step 5. Afterward, if the information notification signal is transmitted from the ECU 1b according to the update file 362 in a state in which the information notification signal transmitted from the ECU 1b according to the update file 361 has not been received by the update device 3, the step numbers stored in the RAMs 13 and 33 are step 7 and step 5, respectively. Then, step 6, which is the number obtained by adding 1 to the step number (here, step 5) contained in the information response signal received by the ECU 1b, is notified to the higher-level task, and thus the higher-level task retransmits the update file 361. Since the step number contained in the information notification signal transmitted from the ECU 1b in response to this retransmission is step 6, each of the step numbers stored in the RAMS 13 and 33 is step 6, so that the mismatch is eliminated. Note that, in this case, the retransmission procedure between the higher-level tasks is not required even if the first update file 361 has not been received by the ECU 1b.

Case (f): The higher-level task on the ECU 1b side resumes the processing on the ECU 1a (ECU 1b after being replaced as described above) side shown in FIG. 3 from step S11, thus bringing about a state in which an instruction of the step number is waited, and instructs the step number at the time of resumption for this processing. In response to this, the processing on the ECU 1a (1b) side shown in FIG. 3 stores the step number instructed in step S11 into the RAM 13, and thus the information notification signal containing the stored step number is transmitted to the ECU 2 (the update device 3 after being replaced as described above), and the entire processing shown in FIG. 3 is resumed. From the description of Cases (a) to (e) discussed above, it is evident that the processing then proceeds such that the step numbers stored in the RAMS 13 and 33 match.

Note that, in Embodiment 3, the step numbers representing the progress of signal transmission/reception between the ECU 1b and the update device 3 are the same consecutive numbers as those for the signal transmission/reception between the ECU 1a and the ECU 2 in Embodiment 1. However, these step numbers may be explicitly distinguished from each other. For example, the software new Ver presence confirmation request may be expressed as step 1_1, the software new Ver presence response as step 1_2, the update file DL preparation request as step 1_3 . . . , the current software Ver information request as step 2_1, the current software Ver response as step 2_2, and the REPRO preparation completion notification as step 2_3 . . . .

For example, in order to denote the progress of mutual signal transmission/reception between the ECU 1b, the update device 3, and the ECU 2 by consecutive step numbers, the software new Ver presence confirmation request may be expressed as step 1, the software new Ver presence response as step 2, the current software Ver information request as step 3, the current software Ver response as step 4, and the update file DL preparation request as step 5 . . . . When all step numbers are explicitly distinguished from each other as in the above-described two examples, the ECU 1b does not need to distinguish between destinations of the lower-level signal, and may broadcast the information notification signal.

As described above, according to Embodiment 3, while the ECU 1b and the update device 3 transmit/receive the communication signal and the updating control program 360 to or from each other, the ECU 1b acquires the new computer program from the update device 3. The ECU 1b distributes the acquired new computer program to the ECU 2, and the ECU 2 stores the distributed new computer program into the ROM 22 thereof, thus updating the computer program in the memory. The ECU 1b updates and stores the step number representing the progress of transmission/reception of the communication signal and the updating control program 360 into the RAM 13 in accordance with the progress of transmission/reception, and transmits, to the update device 3, the information notification signal in which the updated step number is contained. The update device 3 updates the step number stored in the RAM 33 based on the step number contained in the information notification signal received from the ECU 1b, and transmits, to the ECU 1b, the information response signal in which the updated step number is contained. Then, the ECU 1b specifies the communication signal or the updating control program 360 that is to be transmitted/received to or from the update device 3, according to the step number contained in the information response signal received from the update device 3. Consequently, the communication signal or the updating control program 360 that is to be transmitted/received next between the ECU 1b and the update device 3 is specified according to the step number updated by the update device 3 as the signal transmission/reception progresses. Accordingly, it is possible to prevent a lag in the progress of signal transmission/reception between the ECU 1b and the update device.

Furthermore, according to Embodiment 3, if the transmission/reception of the communication signal and the updating control program 360 performed between the ECU 1b and the update device 3 has been interrupted, the ECU 1b updates the step number stored in RAM 13 and transmits the updated step number to the update device 3, according to the communication signal or the updating control program 360 that is to be transmitted/received at the time of resumption. Thereafter, the exchange of the step number is performed in the above-described manner. Accordingly, the communication signal or the updating control program 360 that is to be transmitted/received next between the ECU 1b and the update device 3 is specified such that the step number stored in the RAM 13 of the ECU 1b and the step number stored in the RAM 33 of the update device 3 match to each other after resumption, and it is therefore possible to prevent a lag in the progress of signal transmission/reception between the ECU 1b and the update device 3.

Furthermore, according to Embodiment 1 (or 3), the plurality of divided program segments of the updating control program 160 (or updating control program 360) are sequentially transmitted/received between the ECU 1a and the ECU 2 (or between the ECU 1b and the update device 3). Accordingly, it is possible to prevent a lag in the progress of transmission/reception for the divided update files 161, 162 (or the update files 361, 362 . . . ).

The invention claimed is:

1. A program update system comprising:
 a distribution device with an electronic control unit configured to distribute a computer program; and
 a communication device with an electronic control unit configured to mutually transmit/receive a communication signal and a new computer program, thereby storing the new computer program distributed to the communication device into a memory of the communication device and updating the computer program, wherein:
  a memory of the distribution device and the memory of the communication device are configured to store progress information representing a progress of transmission/reception of the communication signal and the new computer program,
  the electronic control unit of the distribution device is configured to:
   update the progress information stored in the memory of the distribution device, in accordance with the progress of transmission/reception;
   transmit the progress information updated to the communication device;
   if the progress information has been transmitted, receive the progress information stored in the memory of the communication device from the communication device; and
   specify a communication signal or a new computer program that is to be transmitted/received next between the communication device and the distribution device, in accordance with the progress information received, and
  the electronic control unit of the communication device is configured to:
   receive the progress information transmitted from the distribution device;
   update the progress information stored in the memory of the communication device, based on the progress information received; and
   transmit the progress information updated to the distribution device.

2. The program update system according to claim 1, wherein:
the electronic control unit of the distribution device is configured to, if the transmission/reception of the communication signal and the new computer program has been interrupted, update the progress information stored in the memory of the distribution device, according to the communication signal or the new computer program for which transmission/reception is to be resumed.

3. The program update system according to claim 1, wherein:
the electronic control unit of the distribution device is further configured to:
if the transmission/reception of the communication signal and the new computer program has been interrupted, transmit a signal for requesting transmission of the progress information stored in the memory of the communication device to the communication device;
if the signal has been transmitted, receive the progress information stored in the memory of the communication device from the communication device;
compare the progress information received with the progress information stored in the memory of the distribution device;
specify the progress information representing a slower progress, based on a result of the comparison performed;
store and update the progress information specified into the memory of the distribution device; and
transmit the progress information updated to the communication device, and
the electronic control unit of the communication device is further configured to:
receive a signal for requesting transmission of the progress information from the distribution device;
if the signal has been received, transmit the progress information stored in the memory of the communication device to the distribution device;
if the progress information has been transmitted, receive the progress information stored in the memory of the distribution device from the distribution device; and
store and update the progress information received into the memory of the communication device.

4. The program update system according to claim 1, wherein the electronic control unit of the communication device is further configured to:
determine whether the progress represented by the progress information received is faster than the progress represented by the progress information stored in the memory of the communication device by two or more times of transmission/reception of one of the communication signal and the new computer program,
if it is determined that the progress represented by the progress information received is not faster by two or more times of the transmission/reception, store and update the progress information received into the memory of the communication device, and
transmit the progress information stored in the memory of the communication device to the distribution device, regardless of a result of the determination performed.

5. The program update system according to claim 1, wherein:
the new computer program is divided into a plurality of program segments, and
the electronic control unit of the distribution device and the electronic control unit of the communication device are configured to mutually sequentially transmit/receive the divided program segments to or from each other.

6. A program update system comprising:
a distribution device with an electronic control unit configured to distribute a computer program; and
an update device with an electronic control unit configured to hold a computer program that is to be distributed and a new computer program, thereby distributing the new computer program acquired by the distribution device, storing the new computer program distributed to the update device into a memory of the update device, and updating the computer program, wherein:
a memory of the distribution device and the memory of the update device each store progress information representing a progress of transmission/reception of a communication signal and the new computer program,
the electronic control device of the distribution device is configured to:
update the progress information stored in the memory of the distribution device, in accordance with the progress of transmission/reception;
transmit the progress information updated to the update device;
if the progress information has been transmitted, receive the progress information stored in the memory of the update device from the update device; and
specify a communication signal or a new computer program that is to be transmitted/received next between the update device and the distribution device, in accordance with the progress information received; and
the electronic control device of the update device is configured to:
receive the progress information transmitted from the distribution device;
update the progress information stored in the memory of the update device, based on the progress information received; and
transmit the progress information updated to the distribution device.

7. A distribution device that is communicably connected to an external device configured to execute processing based on a computer program stored in a memory, and to mutually transmit/receive a communication signal and a new computer program between the external device and the distribution device, thereby distributing the new computer program to the external device and updating the computer program, the distribution device comprising:
a memory for storing progress information representing a progress of transmission/reception of the communication signal and new computer program; and
an electronic control unit that is configured to:
update the progress information stored in the memory, in accordance with the progress of transmission/reception;
transmit the progress information updated to the external device;
receive, from the external device, the progress information updated by the external device based on the progress information transmitted; and
specify a communication signal or a new computer program that is to be transmitted/received next between the external device and the distribution device, in accordance with the progress information received;

wherein the external device is configured to perform the update and includes an electronic control unit configured to:
- receive the progress information transmitted from the distribution device;
- update the progress information stored in a memory of the external device, based on the progress information received; and
- transmit the progress information updated to the distribution device.

8. A program update method for a communication system with a distribution device configured to distribute a computer program; and a communication device configured to mutually transmit/receive a communication signal and a new computer program, thereby storing the new computer program distributed to the communication device into a memory of the communication device and updating the computer program, wherein a memory of the distribution device and the memory of the update device each store progress information representing a progress of transmission/reception of a communication signal and the new computer program, the method comprising:
- updating, with the distribution device, the progress information stored in the memory of the distribution device, in accordance with the progress of transmission/reception;
- transmitting, with the distribution device, the updated progress information to the communication device;
- receiving, with the distribution device, the progress information stored in the memory of the communication device from the communication device;
- specifying, with the distribution device, a communication signal or a new computer program that is to be transmitted/received next between the communication device and the distribution device, according to the received progress information;
- receiving, with the communication device, the progress information transmitted from the distribution device;
- updating, with the communication device, the progress information stored in the memory of the communication device, based on the received progress information; and
- transmitting, with the communication device, the updated progress information to the distribution device.

9. A program update method for a communication system with a distribution device configured to distribute a computer program; and an update device configured to hold a computer program that is to be distributed and a new computer program, thereby distributing the new computer program acquired by the distribution device, storing the new computer program distributed to the update device into a memory of the update device, and updating the computer program, wherein a memory of the distribution device and the memory of the update device each store progress information representing a progress of transmission/reception of a communication signal and the new computer program, the method comprising:
- updating, with the distribution device, the progress information stored in the memory of the distribution device, in accordance with the progress of transmission/reception;
- transmitting, with the distribution device, the updated progress information to the update device;
- receiving, with the distribution device, the progress information stored in the memory of the update device from the update device;
- specifying, with the distribution device, a communication signal or a new computer program that is to be transmitted/received next between the update device and the distribution device, according to the received progress information;
- receiving, with the update device, the progress information transmitted from the distribution device;
- updating, with the update device, the progress information stored in the memory of the update device, based on the received progress information; and
- transmitting, with the update device, the updated progress information to the distribution device.

* * * * *